(12) United States Patent
Niederriter et al.

(10) Patent No.: US 9,028,007 B2
(45) Date of Patent: *May 12, 2015

(54) COOLING A RANGING ARM GEAR CASE ON A LONGWALL SHEARER

(75) Inventors: Edward F. Niederriter, Fryburg, PA (US); Shawn W. Franklin, Emlenton, PA (US); Philip R. Strydom, Franklin, PA (US); Robert P. Aaron, Marble, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/036,920

(22) Filed: Feb. 28, 2011

(65) Prior Publication Data

US 2011/0309669 A1    Dec. 22, 2011

Related U.S. Application Data

(63) Continuation-in-part of application No. 12/475,456, filed on May 29, 2009, now Pat. No. 8,439,451.

(51) Int. Cl.
| | |
|---|---|
| *E21C 25/06* | (2006.01) |
| *E21C 27/02* | (2006.01) |
| *E21C 29/02* | (2006.01) |
| *E21C 31/12* | (2006.01) |
| *F16H 57/04* | (2010.01) |

(52) U.S. Cl.
CPC ........... *E21C 27/02* (2013.01); *Y10T 74/19642* (2015.01); *E21C 29/02* (2013.01); *E21C 31/12* (2013.01); *F16H 57/0412* (2013.01); *F16H 57/0456* (2013.01); *F16H 57/0495* (2013.01)

(58) Field of Classification Search
USPC .................. 184/6.12; 74/606 A; 475/20, 161; 299/42, 51–54
See application file for complete search history.

(56) References Cited

U.S. PATENT DOCUMENTS

| | | | |
|---|---|---|---|
| 3,666,320 A | 5/1972 | Lanfermann | |
| 4,614,228 A | 9/1986 | Lenk | |
| 4,987,974 A * | 1/1991 | Crouch | ........................ 184/6.12 |
| 5,098,166 A | 3/1992 | Ebner et al. | |
| 5,518,299 A | 5/1996 | Adamczyk et al. | |
| 6,110,070 A * | 8/2000 | Nagai et al. | ........................ 476/8 |
| 7,059,443 B2 * | 6/2006 | Kira | .............................. 180/243 |

FOREIGN PATENT DOCUMENTS

CN     88103728     12/1988

OTHER PUBLICATIONS

Office Action from the Australian Intellectual Property Office for Application No. 2010201917 dated May 30, 2012 (1 page).
Office Action from the Australian Intellectual Property Office for Application No. 2012200718 dated May 30, 2012 (2 pages).

(Continued)

*Primary Examiner* — Sunil Singh
(74) *Attorney, Agent, or Firm* — Michael Best & Friedrich LLP

(57) ABSTRACT

A longwall shearer or other machine with a gear case for transmitting rotational power from a drive to a driven member. The gear case comprises a drive, a driven member, at least one axle including at least one aperture formed therein to circulate cooling fluid through the axle, and a gear mounted to rotate on the axle and positioned to transmit power from the drive to the driven member.

14 Claims, 7 Drawing Sheets

(56) References Cited

OTHER PUBLICATIONS

Office Action from the United States Patent and Trademark Office for U.S. Appl. No. 12/475,456 dated Aug. 6, 2012 (11 pages).
Second Office Action from the Intellectual Property Office of the People's Republic of China for Application No. 201010223982.2 dated Jun. 27, 2014 (7 pages).
Office Action from the Patent Office of the Russian Federation for Application No. 2010121244 dated Sep. 23, 2014 (7 pages).
Notification of First Office Action and Search Report from The State Intellectual Property Office of The People's Republic of China for Chinese Application No. 201010223982.2 dated Nov. 4, 2013 (7 pages).

* cited by examiner

COOLING A RANGING ARM GEAR CASE ON A LONGWALL SHEARER

RELATED APPLICATION

This application is a continuation in part of prior-filed, co-pending U.S. patent application Ser. No. 12/475,456 filed on May 29, 2009.

BACKGROUND

This disclosure relates to a machine including a compact, high power density gear case for transmitting rotational power from a drive to a driven member, and, more particularly, to such a gear case including an improved cooling system.

A variety of different apparatuses exist for mining coal and other materials from underground seams. One apparatus that is commonly used in underground mining operations comprises a continuous mining machine used in instances where extended portions or longwalls of seam are desired to be mined. Such longwalls may, depending upon the seam configuration, extend for distances of 300-1200 feet. It is standard practice in this type of mining to mine parallel entries into the seam to be mined and connect those entries with one or more primary passages. Such arrangement defines the longwall pillar(s) to be mined. The roof of the primary passages is usually supported by movable roof supports during the mining of the exposed "face" of the longwall pillar.

Conventional longwall mining techniques employ a mining machine that is known in the industry as a longwall shearer. A longwall shearer typically has an elongated mobile frame that is supported on floor-mounted tracks that are adjacent and substantially parallel to the mine face. Rotary driven toothed drums are operably supported on arms on each end of the elongated frame for winning the coal as the frame passes back and forth before the mine face. The won material falls into a face conveyor that is usually attached to the floor-mounted tracks and extends parallel to the longwall face. The face conveyor discharges the material onto other conveying apparatuses to transport the material from the seam. As the mine face recedes, the conveyor and track assembly is advanced forward to enable the shearer to continue mining.

As shown in FIG. 1, a longwall shearer mining machine 10 has an elongated mobile frame 12 that is movably supported on a conveyor/track way 14 that is substantially parallel with the longwall face 15. A laterally extending rotary drum 18 which has a plurality of mining bits 19 attached thereto is pivotally attached to each end of the elongated mobile frame 12 by a corresponding ranging arm 16. The operation of the shearer 10 is well known in the mining art and, as such, will not be discussed in detail herein. However, the skilled artisan will appreciate that the shearer 10 is moved back and forth on the track way 14 such that the mining bits 19 on the rotating drums 18 can be brought into engagement with the mine face 15 to dislodge material there from. As the face recedes, the track way 14 and shearer 10 are advanced towards the face 15 to enable the mining process to be continued.

Gear cases used in the ranging arms of longwall shearers are required to be very power dense. This is because the theoretical output of a mining machine is proportional to its installed power, while the operating envelope in a mine requires the package to be as small as possible. The heat generated in these powerful gear cases must be removed on a continuous basis to promote long-term reliability.

Longwall shearer ranging arm gear cases are specialized in nature. They are required to be as compact as possible while being capable of reliably transmitting rotational power to the shearer cutting drum. As with many gear cases with high power density, heat is generated from the losses in the rolling elements and the windage energy of the lubricant. In order to prevent the gear case from overheating and damaging the lubricant, seals and other components, it is common to incorporate some method of cooling the unit.

Further, ranging arm gear cases are required to have a specific shape to make them long enough to extend between the input motor and the output shaft. Owing to this characteristic, they usually have a number of single gears, known as reach gears, mounted in a row (usually 2 to 5) to space the input and output shafts apart. A substantial portion of the heat in the gear case is produced as each of these gears churns at high speeds in the lubrication oil around the gears. Additionally, the friction of their rolling element bearing further contributes to the heat making.

Conventional ranging arm gear case designs utilize either a separate water-cooled heat exchanger that is mounted in the oil reservoir, or a heat exchanger built into the housing of the gear case.

Both of these methods require the gear case to be moderately larger in size and of increased cost of manufacture. In both cases there is also a risk of contamination of the internal lubricating oil with water from a leak in the heat exchanger or water and dirt ingress from the environment due to the required openings in the housing to bring the water into and out of the unit.

SUMMARY

This disclosure proposes to take make use of an underutilized volume in the gear case; the reach-gear mounting axles. These mounting axles are located in the center of each of the 2 to 5 reach gears and are used to rigidly support the gears. The diameter of these axles is of a diameter large enough to fit the required bearing size internal to the reach gear and also large enough to reliably support the forces that are transmitted from the gear through the bearings to the axle and then to the housing.

This disclosure involves the adding of drillings to the gear mounting axles in the ranging arm. Water can then be transmitted through these axles removing heat very near the source, with very little additional complexity.

The significance of this disclosure is that it is an efficient low cost method to achieving heat removal from the gear case without increasing its size. Normally, when heat exchangers are added, either internally or integrally to the housing, they require that the overall package become larger. Since the gear axles are pre-existing, adding a cooler to the center does not increase its overall package size. The centers of these gear axles are not normally utilized, so no compromises are required to fit this feature into the gear case.

This design uses each of these shafts as individual heat exchangers. Each axle is drilled to accept a flow of coolant. This allows the removal of the heat very near its source. The advantages of this design are:

1. The cooling method requires no increase in volume for the gear case.
2. It is very inexpensive to drill these axles during their normal manufacturing process.
3. There is no chance of water ingress into the lubricating oil because the axles are made of impervious material and the water is not connected through the wall of the gear case housing.

4. No special provisions are required to supply coolant to the axles because in conventional ranging arm designs, they are mounted at the edge of a hose trough.

5. They are efficient heat exchangers because they are mounted near the source of the heat.

This disclosure thus provides a cooling system for the gear case in the ranging arm of a longwall shearer, the ranging arm including one or more gears mounted in a row within an elongated housing. The cooling system includes a coolant injection system in each of the single gears, each coolant injection system including one or more longitudinal openings in the gear axle, and may include a coolant injection tube mounted inside a longitudinal opening. The coolant injection tube has a diameter smaller than the diameter of the longitudinal opening.

A coolant supply line is connected to and in communication with the one or more of the longitudinal openings, and a coolant outlet is connected to and in communication with one or more of the longitudinal openings. In one embodiment of the invention, the coolant outlet is connected to and in communication with the longitudinal opening adjacent the one end of the longitudinal opening, so that coolant leaving the end of the coolant injection tube travels back along the coolant injection tube and then out of the gear axle thereby removing heat from the single gear.

In another embodiment of the invention, the coolant outlet is connected to and in communication with a second aperture in the axle such that cooling fluid circulates into the axle through one aperture, flows through the axle and out through the second aperture. In yet another embodiment of the invention, the axle may have multiple output apertures with one or more input apertures such that cooling fluid may flow through and draw heat from more of the axle body.

Figure 1:
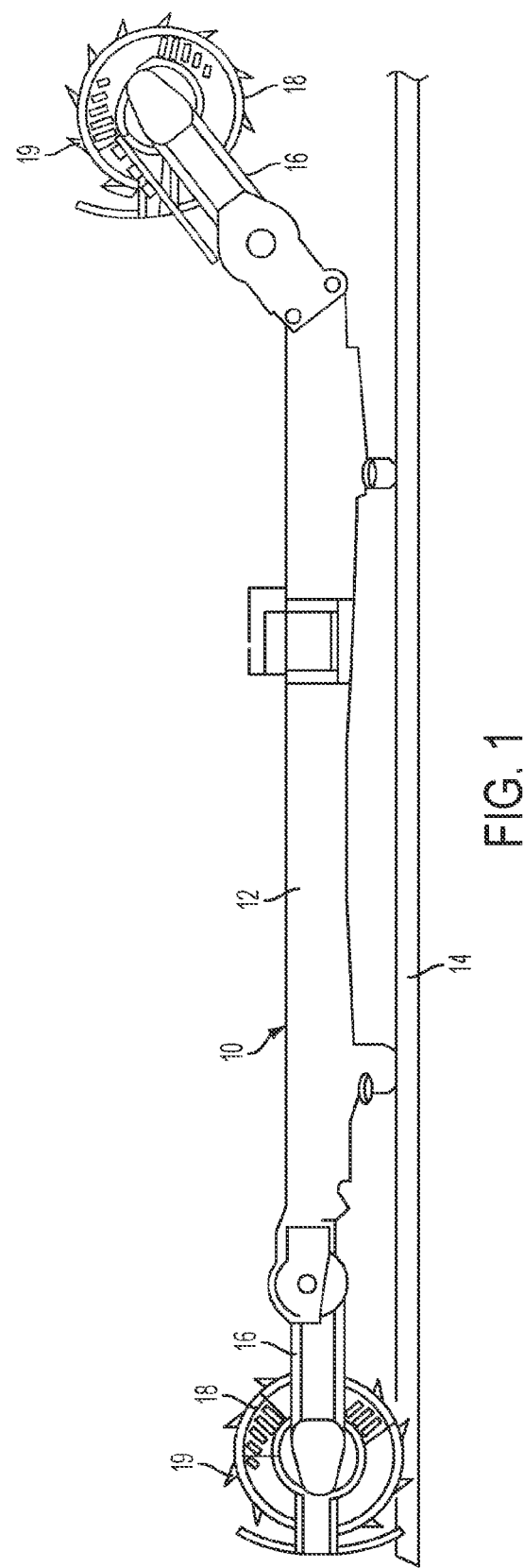
FIG. 1 is a plan view of a longwall shearer including a ranging arm.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DETAILED DESCRIPTION

Figure 2:
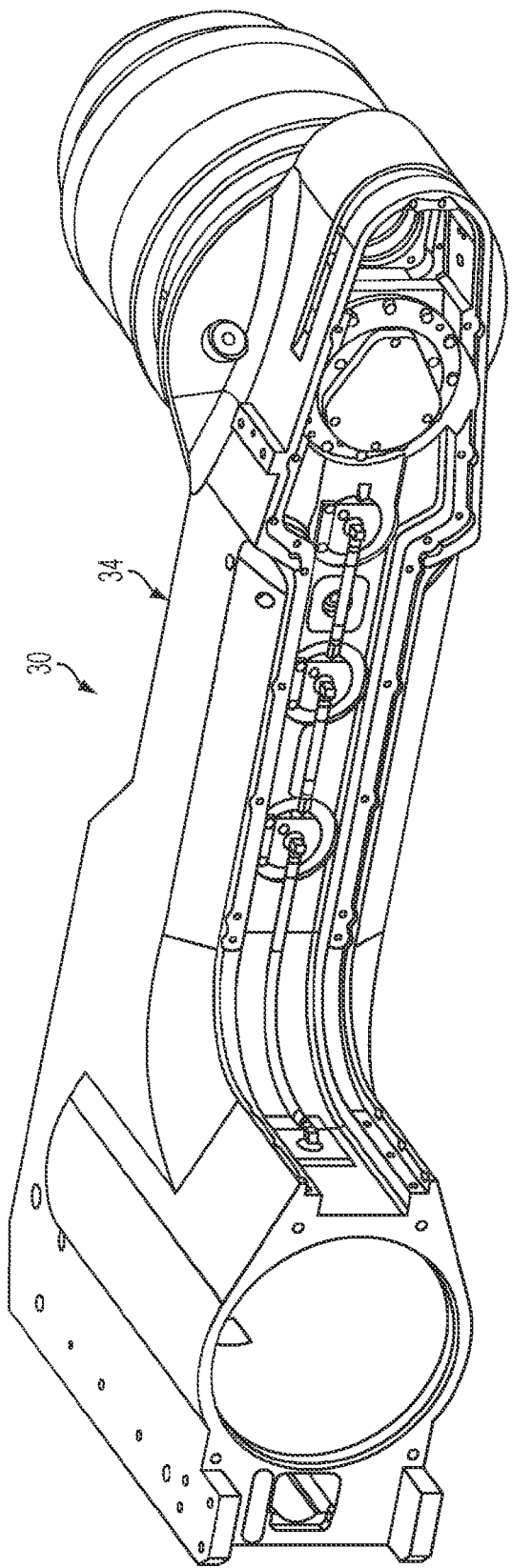
FIG. 2 is an enlarged perspective view of a longwall shearer ranging arm gear case in accordance with this disclosure.
Figure 3:
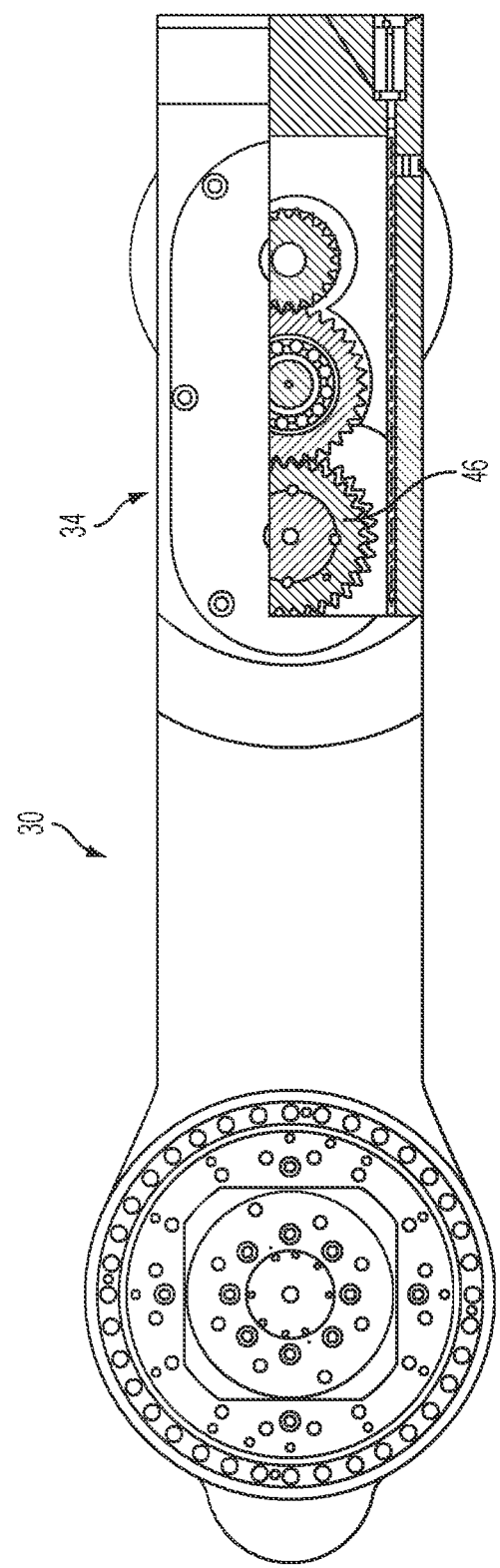
FIG. 3 is side view, partially broken away, of the ranging arm gear case shown in FIG. 2, with a portion broken away to show the gears mounted in a row inside the gear case.

The preferred embodiment relates to an improvement to the ranging arm 16 shown in FIG. 1. More particularly, an improved ranging arm 30 is shown in FIGS. 2 through 4.

Figure 4:
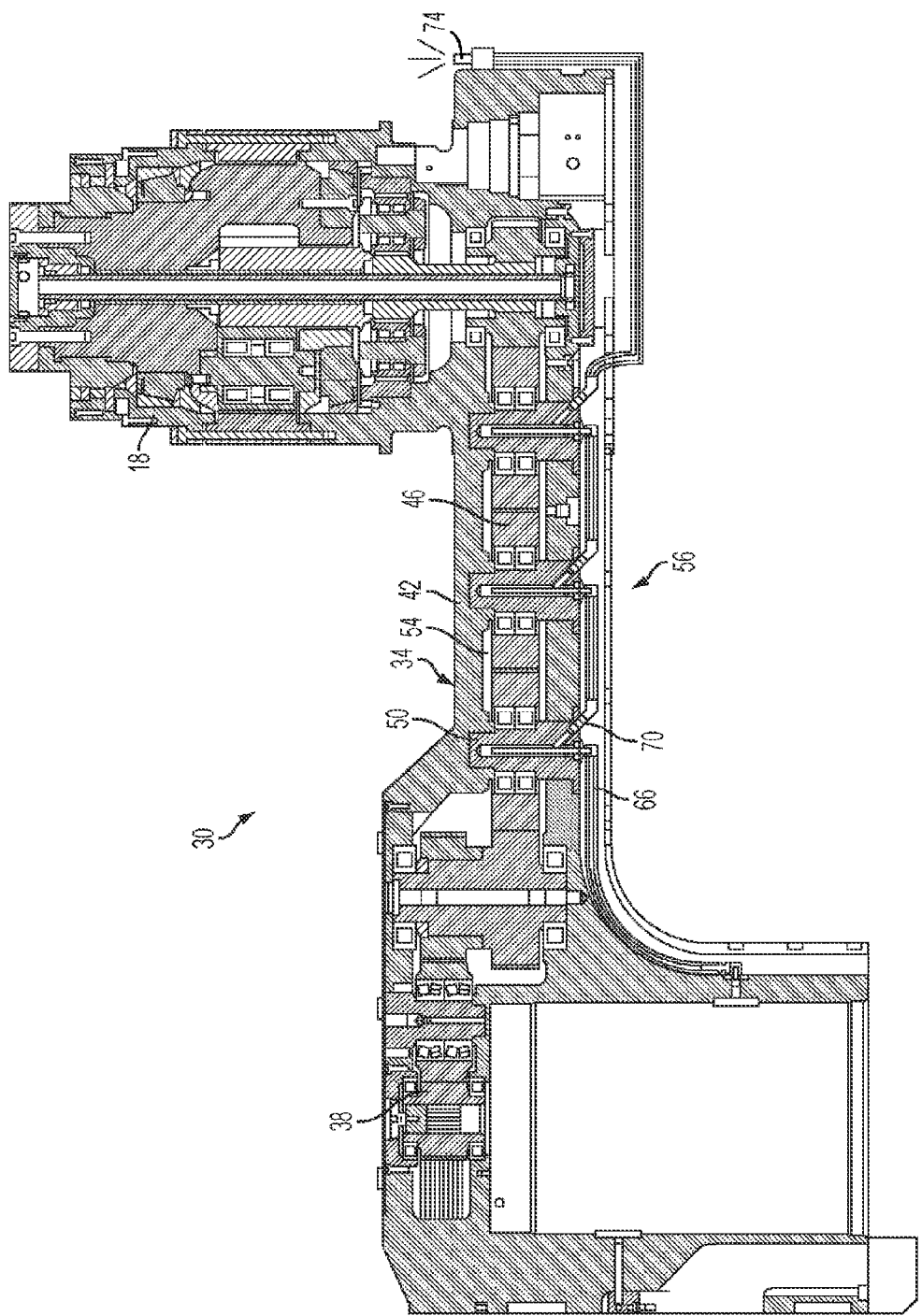
FIG. 4 is a top section view of the longwall shearer ranging arm gear case.

As shown in FIG. 4, the disclosed longwall shearer ranging arm 30 includes a gear case 34 for transmitting rotational power from a drive 38 to the rotary driven toothed drum 18. The gear case 34 includes an elongated housing 42, and a plurality of single gears 46 mounted in a row within the elongated housing 42. One gear at one end of the row is drivingly connected to the drive 38, and another gear at another end of the row is drivingly connected to the driven member, which is the drum 18. Each single gear mounting is in the form of a longitudinal gear axle 50 having a mounting axis extending longitudinally along the gear axle 50, and lubricating oil 54 surrounding the single gears 46 and contained within the housing 42.

Figure 5:
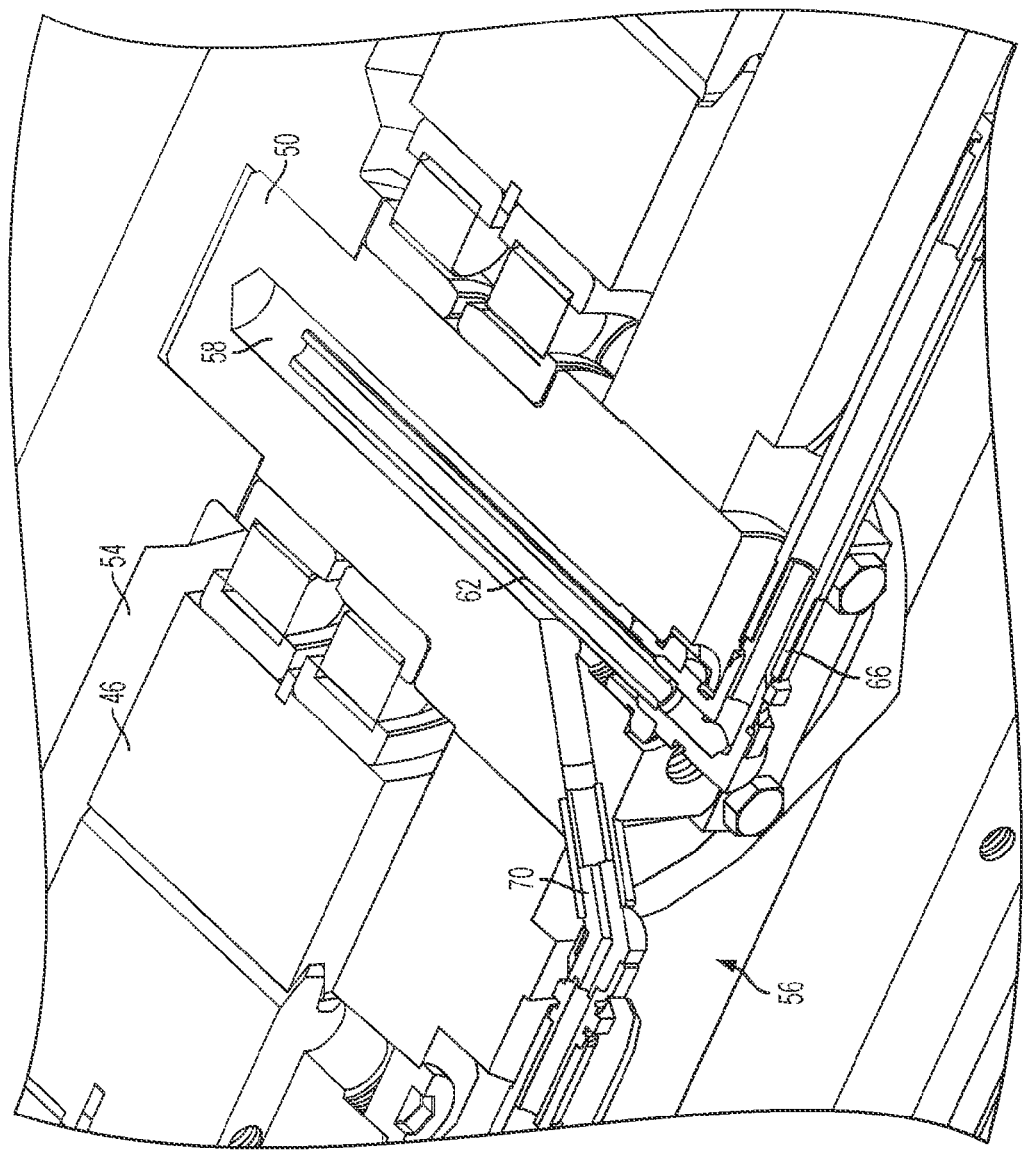
FIG. 5 is an enlarged sectional view of one of the gears shown in FIGS. 3 and 4.

This disclosure presents a new cooling system for the gear case 34, the cooling system including a coolant injection system 56 in each of the single gears 46. As shown in FIGS. 4 and 5, each coolant injection system 56 includes a longitudinal opening 58 (see FIG. 5), such as by drilling, in the gear axle 50, extending a substantial distance along the mounting axis, and a coolant injection tube 62 mounted inside the longitudinal opening 58, extending a substantial distance from one end of the longitudinal opening 58 inside the longitudinal opening 58. The coolant injection tube 62 has a diameter smaller than the diameter of the longitudinal opening 58. A coolant supply line 66 is connected to and in communication with the coolant injection tube 62, and a coolant outlet 70 is connected to and in communication with the longitudinal opening 58 adjacent the one end of the longitudinal opening having the injection tube 62 mounted therein, so that coolant leaving the end of the coolant injection tube 62 travels back along the coolant injection tube 62 and then out of the gear axle 50, thereby removing heat from the single gear 46.

More particularly, in the illustrated embodiment, the mounting axis is in the center of the gear axle 50, and the longitudinal opening 58 has a constant diameter along its length, and the coolant injection tube has a constant diameter. In other embodiments (not shown), the longitudinal opening, as well as the coolant injection tube, could have varying diameters along their length.

More particularly, in the illustrated embodiment, the plurality of single gears consists of three gears (see FIGS. 2, 3 and 4), and all three gears include a coolant injection system. In other embodiments (not shown), the gear case may include only two gears, both of which include a coolant injection system, or three gears or more gears, at least two of which include a coolant injection system.

The supply of coolant communicates with the coolant supply line of one of the single gears, and the one of the single gears coolant outlet communicates with the next adjacent coolant supply line. The coolant from the coolant outlet is then discharged at a nozzle 74 adjacent the rotary driven toothed drum 18.

Figure 6:
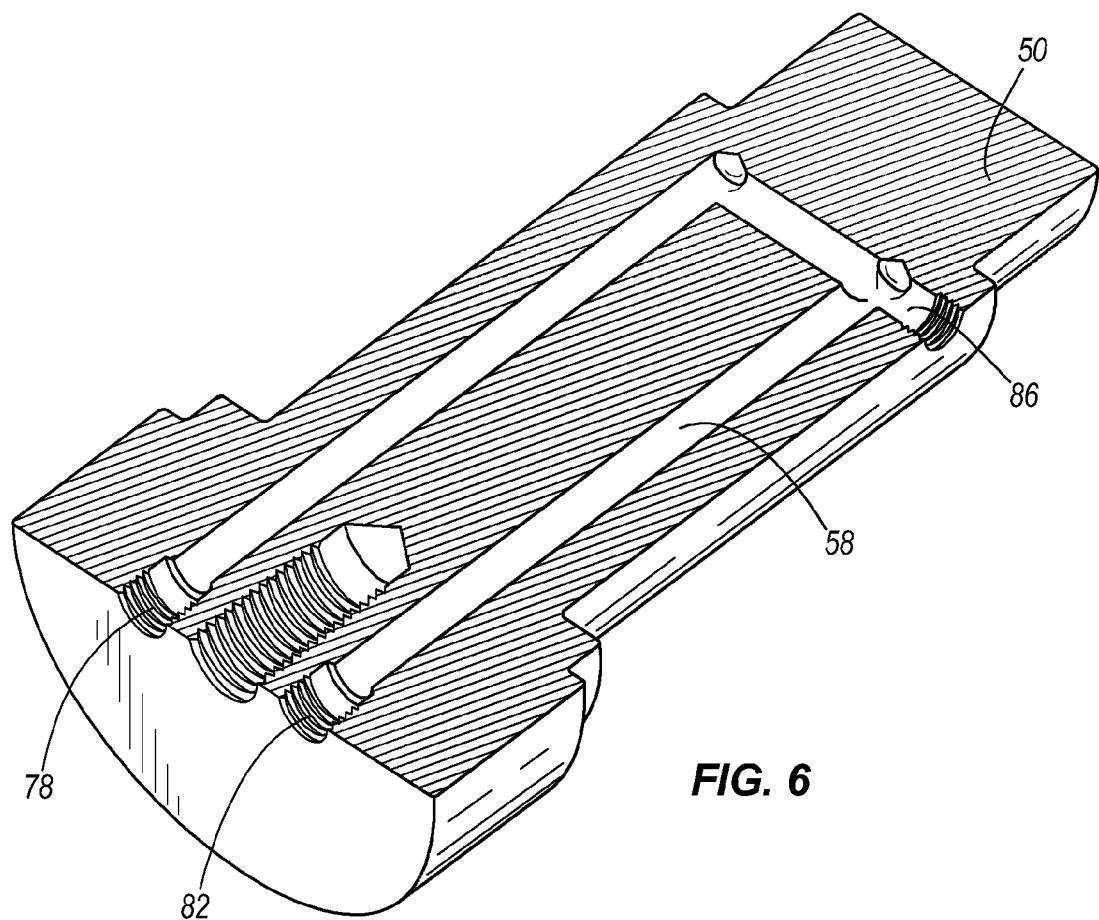
FIG. 6 is an enlarged sectional view similar to FIG. 5 showing an another embodiment of the gear axle.
Figure 7:
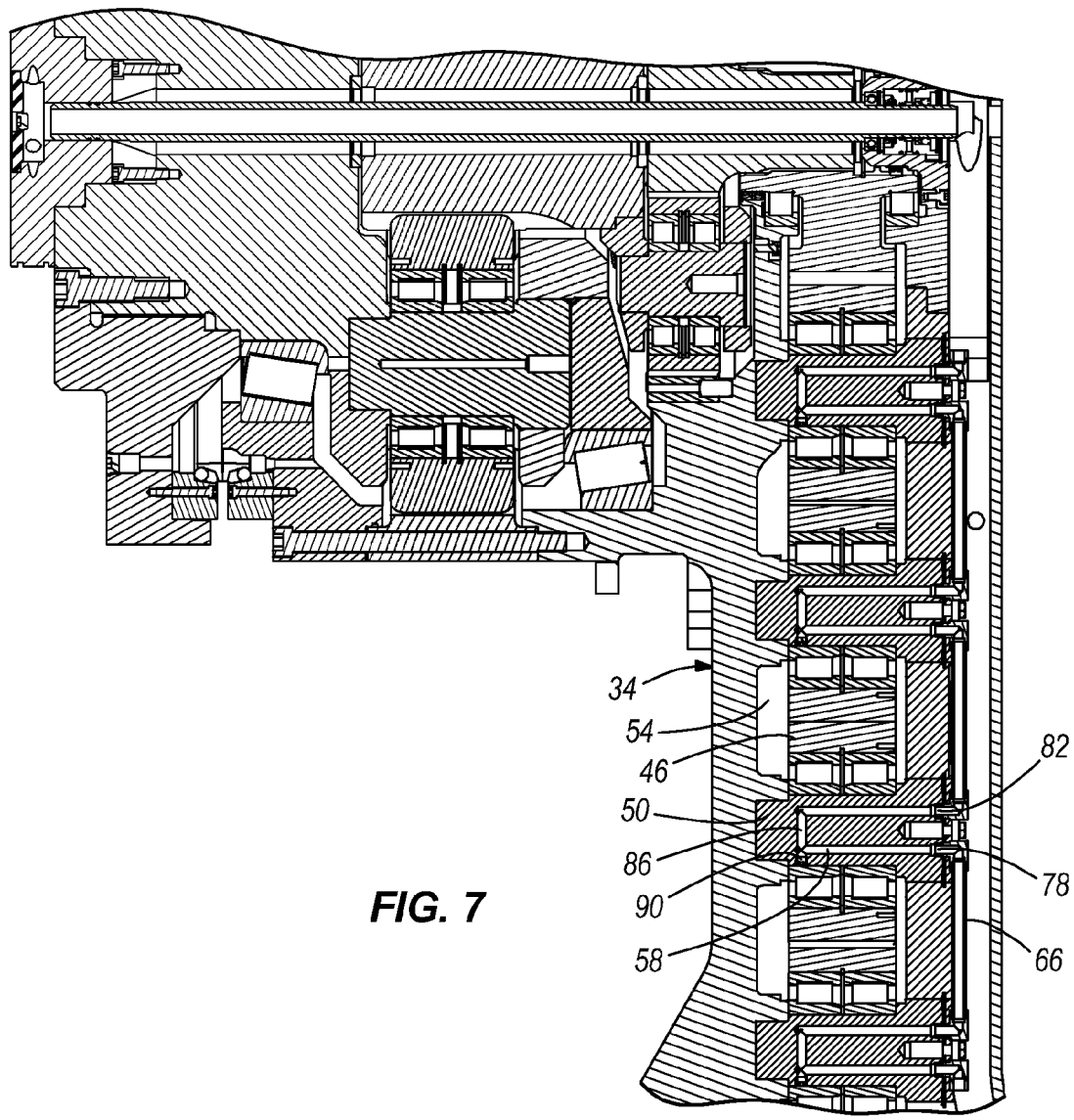
FIG. 7 is a view similar to FIG. 4, showing a sectional view of a ranging arm gear case using the gear axles of FIG. 6.

In another embodiment, shown in FIGS. 6 and 7, the gear axle 50 comprises multiple longitudinal openings 58 disposed to circulate cooling fluid and connected to a separate input aperture 78 and output aperture 82. The longitudinal openings are connected to one another via a cross-drilled hole 86. The opening of the cross-drilled hole 86 is plugged with a standard pipe plug 90 during normal use of the invention so that coolant may circulate into the gear axle 50 through the input aperture 78, through the cross-drilled hole 86, and out through the output aperture 82 without allowing coolant to otherwise escape from the gear axle.

FIG. 7 demonstrates a gear case 34 comprising four gear axles 50 (as shown in FIG. 6) mounted with gears 46 to deliver power to the rotary driven toothed drum (not shown). Coolant flows to a gear axle 50 via a coolant supply line 66, connected to and in communication with the input aperture 72. Coolant enters the gear axle 50 through the input aperture 72, through a first longitudinal opening 58, through a cross-drilled hole 86, and then through a second longitudinal opening 58 and out through the output aperture 82, carrying with it waste heat from the gears. Coolant is then conveyed to the next gear axle 50 in series or out of the machine via a coolant supply line 66, connected to and in communication with the output aperture 82. The side opening of the cross-drilled hole 86 remains plugged at all times while the machine is in operation so that coolant does not come into direct contact with either the gears 46 or the lubricating oil 54.

Various other features of this disclosure are set forth in the following claims.

What is claimed is:

1. A machine including a gear case for transmitting rotational power from a drive to a driven member, said gear case comprising:
   a plurality of axles, each axle including at least one aperture formed therein to circulate cooling fluid through the axle, the plurality of axles including at least a first axle and a second axle;
   a plurality of gears mounted to rotate on the plurality of axles and positioned to transmit power from the drive to the driven member; and
   a coolant supply line connecting an output port of the first axle with an input port of the second axle such that cooling fluid flows out of the first axle and into the second axle.

2. A machine as set forth in claim 1 wherein each axle further includes at least one output port.

3. A machine as set forth in claim 1 the aperture of each axle forms both input and output ports for the cooling fluid flowing through the axle.

4. A machine as set forth in claim 1 wherein one of the at least one apertures form an input port for introduction of cooling fluid into the axle and one of the at least one apertures form an output port, separate from the input port, and for discharging cooling fluid from the axle.

5. A machine as set forth in claim 4 and further comprising a coolant supply line connecting an output port of the first axle with an input port of the second axle such that coolant flows out of the first axle and into the second axle.

6. A machine as set forth in claim 1 wherein the aperture of each axle is in the center of each axle.

7. A machine in accordance with claim 1 wherein said at least one aperture communicates with a conduit in the axle that has a constant diameter along its length.

8. A longwall shearer comprising
   a floor-mounted track,
   an elongated mobile frame supported on the floor-mounted track,
   at least one arm on each end of the elongated frame, comprising at least one rotary driven toothed drum, each of which is operably supported on the arm for winning mining material as the mobile frame passes back and forth along the floor mounted track,
   wherein each arm includes a gear case for transmitting rotational power from a drive to said rotary driven toothed drum, said gear case comprising:
   a driven member attached to the rotary driven toothed drum;
   a plurality of axles, each axle including at least one aperture formed therein to circulate cooling fluid through the axle, the plurality of axles including at least a first axle and a second axle;
   a plurality of gears mounted to rotate on the plurality of axles and positioned to transmit power from the drive to the driven member; and
   a coolant supply line connecting an output port of the first axle with an input port of the second axle such that cooling fluid flows out of the first axle and into the second axle.

9. A longwall shearer as set forth in claim 8 wherein each axle further includes at least one output port.

10. A longwall shearer as set forth in claim 8 the aperture of each axle forms both input and output ports for the cooling fluid flowing through the axle.

11. A longwall shearer as set forth in claim 8 wherein one of the at least one apertures form an input port for introduction of cooling fluid into the axle and one of the at least one apertures form an output port, separate from the input port, and for discharging cooling fluid from the axle.

12. A longwall shearer as set forth in claim 11 and further comprising a coolant supply line connecting an output port of the first axle with an input port of the second axle such that coolant flows out of the first axle and into the second axle.

13. A longwall shearer as set forth in claim 8 wherein aperture of each axle is in the center of each axle.

14. A longwall shearer in accordance with claim 8 wherein said at least one aperture communicates with a conduit in the axle that has a constant diameter along its length.

* * * * *